US012722148B2

(12) United States Patent
Bittencourt et al.

(10) Patent No.: US 12,722,148 B2
(45) Date of Patent: Sep. 1, 2026

(54) METHOD FOR PREPARING WATER GAS SHIFT CATALYSTS, CATALYSTS AND PROCESS FOR REDUCING CARBON MONOXIDE CONTENT

(71) Applicant: PETRÓLEO BRASILEIRO S.A.—PETROBRAS, Rio de Janeiro (BR)

(72) Inventors: Roberto Carlos Pontes Bittencourt, Rio de Janeiro (BR); Cristina Pontes Bittencourt Quitete, Rio de Janeiro (BR); Mauri Jose Baldini Cardoso, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 496 days.

(21) Appl. No.: 18/565,166

(22) PCT Filed: Jun. 3, 2022

(86) PCT No.: PCT/BR2022/050199

§ 371 (c)(1),
(2) Date: Nov. 29, 2023

(87) PCT Pub. No.: WO2022/251943

PCT Pub. Date: Dec. 8, 2022

(65) Prior Publication Data

US 2024/0261772 A1 Aug. 8, 2024

(30) Foreign Application Priority Data

Jun. 4, 2021 (BR) .......................... 1020210109076

(51) Int. Cl.

| | |
|---|---|
| ***B01J 37/03*** | (2006.01) |
| ***B01J 23/89*** | (2006.01) |
| ***B01J 35/70*** | (2024.01) |
| ***B01J 37/02*** | (2006.01) |
| ***B01J 37/06*** | (2006.01) |
| ***B01J 37/08*** | (2006.01) |
| ***C01B 3/40*** | (2006.01) |
| ***C01B 3/48*** | (2006.01) |

(52) U.S. Cl.
CPC ........... *B01J 37/03* (2013.01); *B01J 23/8906* (2013.01); *B01J 35/70* (2024.01); *B01J 37/0236* (2013.01); *B01J 37/06* (2013.01); *B01J 37/088* (2013.01); *C01B 3/40* (2013.01); *C01B 3/48* (2013.01); *C01B 2203/0283* (2013.01)

(58) Field of Classification Search
CPC ........ B01J 37/03; B01J 23/8906; B01J 35/70; B01J 37/0236; B01J 37/06; B01J 37/088; B01J 21/00; B01J 21/12; B01J 23/58; B01J 23/745; B01J 23/89; B01J 35/30; B01J 35/393; B01J 35/613; B01J 35/615; B01J 37/031; C01B 3/40; C01B 3/48; C01B 2203/0283; C01B 3/16
See application file for complete search history.

(56) References Cited

U.S. PATENT DOCUMENTS

| | | | | |
|---|---|---|---|---|
| 5,830,425 | A * | 11/1998 | Schneider ............ | B01J 23/8926 423/655 |
| 7,160,533 | B2 | 1/2007 | Hagemeyer et al. | |
| 7,682,598 | B2 * | 3/2010 | Hagemeyer ............... | C01B 3/16 423/655 |
| 7,744,849 | B2 | 6/2010 | Hagemeyer et al. | |
| 7,824,455 | B2 | 11/2010 | Faur-Ghenciu et al. | |
| 2012/0063989 | A1 | 3/2012 | Hatscher et al. | |
| 2017/0267608 | A1 * | 9/2017 | Wang ..................... | B01J 23/745 |

FOREIGN PATENT DOCUMENTS

| | | | | |
|---|---|---|---|---|
| CN | 102350355 A | * 2/2012 | | |
| KR | 20130115885 A | * 10/2013 | .......... | B01J 37/0201 |
| WO | 2011056715 | 5/2011 | | |
| WO | 2016197211 | 12/2016 | | |

OTHER PUBLICATIONS

International Search Report for PCT/BR2022/050199, Sep. 9, 2022.
Jeong, D., Potdar. H. S., Kim, K., Roh, H. The effect of sodium in activity enhancement of nano-sized Pt/Ce02 catalyst for water gas shift reaction at low temperature. Bull. Korean Chem, Soc., v. 32, No. 10, p. 3557, 2011.
Zhu X., Shen M., Lobban L. L., Mallinson, R.G. Structural effects of Na promotion for high water gas shift activity on Pt-Na/Ti02. Journal of Catalysis, v. 278, p. 123-132, 2011.

(Continued)

*Primary Examiner* — Anthony J Zimmer
*Assistant Examiner* — Abdul-Rahman Yusuf Waleed Smari
(74) *Attorney, Agent, or Firm* — Womble Bond Dickinson (US) LLP

(57) ABSTRACT

The present invention relates to HTS catalysts applied in hydrogen or synthesis gas production units, whether in steam reforming, autothermal reforming, dry or gasification reforming, chromium-free, consisting of iron oxide, containing platinum contents between 0.1 to 0.4% w/w, promoted by sodium contents between 0.1 to 0.3% w/w, and optionally aluminum contents between 5.0 to 6.0% w/w inserted into the crystal lattice of an iron oxide with a hematite ($Fe_2O_3$) crystal structure, thus, allowing high activity to be reconciled with excellent resistance to deactivation by exposure to high temperatures. In a second aspect, the present invention provides a carbon monoxide conversion process by bringing the catalyst into contact with a synthesis gas stream, where the maximum bed temperature can be limited by the injection of water or steam next to the feed of CO-containing gas at the reactor inlet.

11 Claims, 3 Drawing Sheets

(56) References Cited

OTHER PUBLICATIONS

Paul Chin, Xiaolei Sun, George W. Roberts, James J. Spivey. Preferential oxidation of carbon monoxide with iron-promoted platinum catalysts supported on metal foams. Applied Catalysis A: General, v. 302, . 22-31, 2006.
D.B. Pal, R. Chand, S.N. Upadhyay, p. K. Mishra. Performance of water gas shift reaction catalysts: A review. Renewable and Sustainable Energy Reviews, v. 93, p. 549-565, 2018.
Vincenzo Palma, Concetta Ruocco, Marta Cortese, Simona Renda, Eugenio Meloni , Giovanni Festa, Marco Martino. Platinum Based Catalysts in the Water Gas Shift, Reaction: Recent Advances. Metals, v. 10, p. 866, 2020.
Anna Basinska, Tomasz P. Maniecki, Wojciech K. Jozwiak, Catalytic activity in water-gas shift reaction of platinum group metals supported on iron oxides. React. Kinet. Cata!. Lett., v. 89, No. 2, p. 319-324, 2006.

* cited by examiner

METHOD FOR PREPARING WATER GAS SHIFT CATALYSTS, CATALYSTS AND PROCESS FOR REDUCING CARBON MONOXIDE CONTENT

FIELD OF THE INVENTION

The present invention relates to a method for preparing water gas shift catalysts, chromium-free, and a process for their use applied in hydrogen or synthesis gas production units, either by reforming steam, autothermal reforming, dry or gasification reforming, aiming to reduce the safety, environmental and health impacts related to the manufacturing, handling and disposal of used material.

DESCRIPTION OF THE STATE OF THE ART

The water gas shift reaction ("water gas shift" or just "shift") is an integral step in the steam reforming process for hydrogen production. The reaction can be represented by equation 1, being exothermic and typically limited by thermodynamic equilibrium.

$$CO + H_2O = CO_2 + H_2 \quad \text{(eq. 1)}$$

The reaction produces $H_2$ and, simultaneously, reduces the level of CO, which is a contaminant for catalysts used in ammonia synthesis, hydrotreatment processes and for use in fuel cells, which make use of high purity hydrogen. In synthesis gas generation processes, the "water gas shift" reaction is used to adjust the desired proportion of CO and $H_2$. The "water gas shift" reaction is also part of other $H_2$ production processes, such as partial oxidation, autothermal reforming and hydrocarbon gasification processes, including biomass.

In the steam reforming process, the "water gas shift" reaction is conducted, in a typical configuration, in a first stage, called "High Temperature Shift" (HTS) whose catalyst operates at typical temperatures between 330° C. at the inlet and up to 450° C. at outlet of the reactor, followed by cooling the effluent stream and additional reaction, in a second stage, called "Low Temperature Shift" (LTS), whose catalyst operates at typical temperatures between 180° C. at the inlet to 240° C. at the outlet of the reactor. In a variation of the process configuration, the LTS reactor and the subsequent $CO_2$ separation system by amine are replaced by a "Pressure Swing Adsorption" (PSA) step. Pressure conditions in the "shift" stage are dictated by the use of hydrogen and are typically between 10 and 40 bar.

Commercial LTS catalysts consist of copper oxide, zinc oxide and alumina, with typical contents between 40 and 35% m/m; 27 to 44% m/m with alumina as balance, respectively. They may also contain minor amounts of alkaline promoters, such as cesium (Cs) or potassium (K). LTS catalysts quickly lose activity when exposed to high temperatures, which is why they are used in the typical temperature range of 180° C. to 240° C., or in its "Medium Temperature Shift" (MTS) version at temperatures from 180° C. to 330° C. The lower temperature of the use range is normally dictated by the requirement that steam condensation not occur in the reactor at the operating pressure of the unit.

The HTS catalyst industrially used in large units, here considered units with production greater than 50,000 $Nm^3/d$ of hydrogen, consists of iron (Fe), chromium (Cr) and copper (Cu), mostly in form of oxides, before the catalyst starts operating, and, after the start of operation, consisting of metallic copper and iron and chromium oxides. Despite being widely used, the formulation of this catalyst has the disadvantage of containing chromium in its formulation. Particularly, during the calcination steps to manufacture this catalyst, the formation of variable levels of chromium in oxidation state VI ($CrO_3$ or $Cr^{6+}$) is inevitable, a compound that has known carcinogenic effects and damage to the environment, being subject to an increasing rigor of legislation worldwide. As an example, the strict rules for workplace exposure to $Cr^{6+}$ by OSHA (US Occupation Health and Safety Organization) can be mentioned. The presence of $Cr^{6+}$, therefore, has negative impacts on the manufacturing process, handling, transportation, loading, unloading and disposal of the material. Therefore, it is desirable to produce an HTS catalyst free of chromium in its formulation.

A logical solution to producing a chromium-free catalyst is to simply eliminate it from the catalyst composition. However, the literature teaches that chromium plays an essential role in the formulation of the HTS catalyst, reducing the loss of surface area of the iron oxide phases present in the catalyst at the usual process temperatures, that is, between 330° C. and 500° C. Consequently, it reduces the deactivation rate of the material, allowing the catalyst to maintain good performance throughout the campaign period of the unit, typically lasting between 3 and 5 years, this function being known in the catalysis area as that of a structural promoter.

The literature reports several studies to replace chromium in HTS catalyst formulations with compositions based on iron, chromium and copper. In PAL, D. B. et al. (2018) "Performance of water gas shift reaction catalysts: A review", Renewable and Sustainable Energy Reviews, volume 93, pages 549 to 565 studies on the replacement of chromium with several elements, such as cerium, silicon, titanium, magnesium, zirconium and aluminum oxides. However, in industrial practice, an efficient method of preparing an HTS catalyst using a chromium substitute element that maintains high resistance properties to deactivation by exposure to high temperatures is not yet available.

A solution to aid the thermal stability of chromium-free HTS catalysts would be to use them at low temperatures. However, it would be necessary to use an activity promoter, since the iron oxide phases are only active at typical temperatures of 320° C. to 330° C. Copper would be a candidate for activity promoter, since it has low cost and is extensively used in LTS catalysts, however, it suffers from problems of a relatively high rate of deactivation upon exposure to temperatures in the range of 250° C. to 350° C. Other candidates would be noble metals, especially platinum, considering their greater availability and lower relative cost in relation to other noble metals.

There are several teachings on the use of platinum (Pt) in shift catalyst formulations. The U.S. Pat. No. 7,744,849 teaches a catalyst for the water gas shift reaction comprising a platinum-based catalyst, with at least one alkaline earth metal and at least one third metal. Specifically, the catalyst in this patent comprises: a) Pt, b) at least one of Li, Na, K, Rb, Cs, Mg, Ca, Sr, Ba, oxides and mixture thereof, and c) at least one of Sc, Y, Ti, Zr, V, Nb, Ta, Cr, Mo, W, Mn, Fe, Co, Ir, Ni, Pd, La, Ce, Pr, Nd, Sm, Eu, oxides and mixtures thereof, and can be supported in one or in combination of aluminum, zirconium, titanium, cerium, magnesium, lanthanum, niobium, yttrium or iron oxides. Said catalyst can be used in compact hydrogen production equipment.

The patent application US 2012/0063989 discloses a catalyst for the conversion of CO into carbon dioxide ($CO_2$) through a water gas shift reaction. The catalyst comprises a noble metal between 0.001 and 1.10% m/m, at least one alkali or alkaline earth metal, at a level between 1.0 and 4% m/m and at least one dopant consisting of Fe, Cr, Cu, Zn or mixture thereof on a support material, containing Ce or Zr.

The U.S. Pat. No. 7,824,455 describes the application of a precious metal catalyst of Pt, Pd or mixtures thereof, or mixtures of Pt—Ir for the shift exchange reaction in the temperature range of 200° C. to 400° C., supported on a mixture of Ce and Zr oxides, with Ce in the range of 20 to 58% or 58 to 80% and Zr in the range of 42 to 20%, with, as promoter, at least one metal selected from yttrium, alkali metals or alkaline earth metals in the range 0.01 to 1%.

The patent application US 2018/0093261 discloses a catalyst consisting of iron and chromium oxides and containing platinum at levels between 0.01 and 1.5% m/m. Several other teachings on the use of platinum in the formulation of shift catalysts can be found.

In the article by RATNASAMY, C.; WAGNER, J. P. (2009) "Water Gas Shift Catalysis", Catalysis Reviews, volume 51, pages 325 to 440, they review the literature and teach the use of platinum deposited on several oxides, such as zirconium, vanadium, alumina and cerium oxides.

An important point for the use of noble metals in HTS catalyst formulations is to seek to obtain the maximum possible activity of the metallic phase, since noble metals have a high cost, which may make the commercial use of these catalysts in large-capacity hydrogen production units unfeasible. The literature teaches the addition of alkali metals in the formulation of "shift" catalysts containing Pt, as activity promoters. Beneficial results in CO conversion activity by the water gas shift reaction have been observed for sodium contents between 1 and 10% m/m in Pt—Na/$TiO_2$ catalysts prepared by co-impregnation, as described in ZHU, X. et al. (2011) "Structural effects of Na promotion for high water gas shift activity on Pt—Na/$TiO_2$", Journal of Catalysis, volume 278, pages 123 to 132, and 1% sodium contents in prepared Pt/$CeO_2$ catalysts by impregnation in JEONG, D. W. et al. (2011) "The Effect of Sodium in Activity Enhancement of Nano-sized Pt/$CeO_2$ Catalyst for Water Gas Shift Reaction at Low Temperature", Bulletin of Korean Chemical Society, volume 32, pages 3557 to 3558. In literature teachings, alkali metals are incorporated by additional specific and additional preparation steps and in levels typically above 1% m/m and using oxides. Still in relation to alkali metals, their effect on the thermal stability of the catalyst is not taught, nor is the effect of sodium content on the thermal stability of the catalyst reported.

The document U.S. Pat. No. 7,160,533 claims a catalyst containing Pt and Ru. The Ru phase is very active but would present low selectivity. The catalyst formulation containing Pt, Ru and alkali metals seeks to moderate the methanation reaction. The catalyst is also prepared using the impregnation method, where the noble metals are deposited on a pre-formed support. The use of combinations of noble metals adds additional costs and is difficult to use for large-scale catalyst production, especially when using noble metals with limited reserves.

Thus, although there are numerous references in the literature to the use of Pt in formulations of water gas shift catalysts, there remains a need to provide a preparation method and a formulation of a "High Temperature Shift" catalyst, free of chromium (Cr), which has high activity associated with excellent resistance to deactivation by exposure to high temperatures, with the lowest possible levels of Pt, and with a practical, low-cost method and the incorporation of promoters to increase activity and resistance to deactivation by prolonged exposure to high temperatures.

In order to solve such problems, the present invention was developed, through which a chromium- and copper-free catalyst formulation was adopted, consisting of iron oxide containing platinum (Pt), sodium (Na) and optionally aluminum (Al) inserted into the crystal lattice of an iron oxide with a hematite ($Fe_2O_3$) crystal structure.

In a second aspect of the present invention, a method of reducing the CO content by the water gas shift reaction, using said catalyst, is disclosed.

The present invention contributes decisively to reducing the CO content effluent from the process, which increases energy efficiency and contributes to better operation of the PSA system. A more active HTS catalyst has the estimated potential to contribute to reducing production costs by around 1%.

The elimination of chromium from the HTS catalyst formulation, especially in its carcinogenic $Cr^{6+}$ form, minimizes risks during catalyst handling, loading and unloading steps.

The use of a more active HTS catalyst makes it possible to tolerate greater abnormalities in the steam reforming process for hydrogen production, which could lead to increased pressure loss and/or formation of by-products in the reactor, causing risks of shutdowns unscheduled.

Furthermore, the use of a more active catalyst in the $H_2$ production process allows for greater energy efficiency and thus contributes to reducing $CO_2$ emissions, estimated at 10 t $CO_2$/t $H_2$ in a traditional configuration. The $H_2$ production process, together with the FCC process, are the two largest $CO_2$ emitters from refining.

BRIEF DESCRIPTION OF THE INVENTION

The present invention relates to HTS catalysts, chromium-free (Cr), containing Pt contents between 0.1 and 0.4% m/m, promoted by sodium (Na) with contents between 0.1 and 0.3% m/m, and optionally aluminum contents between 5.0 and 6.0% m/m in iron oxide balance, which allows high activity to be reconciled with excellent resistance to deactivation due to exposure to high temperatures.

In a second aspect, the present invention provides a process for converting carbon monoxide from a synthesis gas stream using said catalyst and a vapor/gas ratio between 0.2 and 1.0 mol/mol, pressures between 10 and 40 atm and temperatures between 250° C. and 450° C., or preferably between 250° C. and 370° C., where the maximum bed temperature can be limited by the injection of water or steam together with the CO-containing gas feed at the reactor inlet.

The invention is applied in hydrogen or synthesis gas production units, whether through steam, autothermal reforming, dry or gasification reforming.

BRIEF DESCRIPTION OF THE DRAWINGS

The present invention will be described in more detail below, with reference to the attached figures which, in a schematic way and not limiting the inventive scope, represent examples of its implementation. In the drawings, there are.

DETAILED DESCRIPTION OF THE INVENTION

Figure 1:
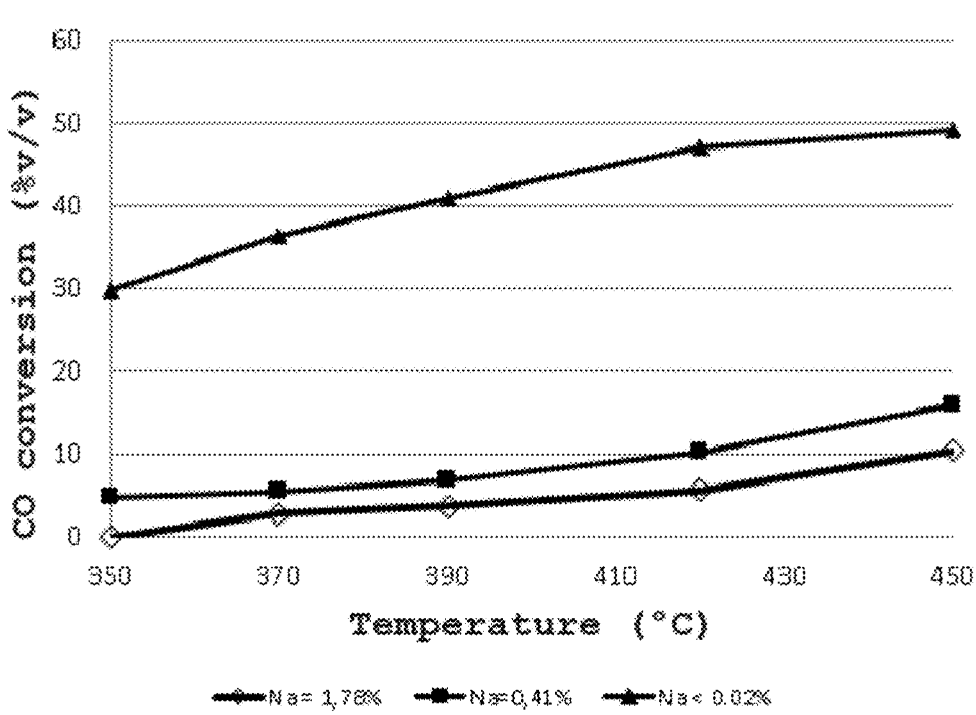
FIG. 1 illustrating a graph of the CO conversion activity in the water gas shift reaction in the catalysts prepared in accordance with EXAMPLE 1, with different residual sodium contents.

Broadly speaking, the present invention relates to catalysts applicable to the conversion of CO to $CO_2$ and $H_2$ by the water gas shift reaction. Such catalysts are made up of an iron oxide support with a crystalline structure identifiable by the X-ray diffraction technique as hematite, promoted by platinum (Pt) contents between 0.1 and 0.4% m/m and with a content of sodium (Na) between 0.1 and 0.3% m/m, based on the oxidized material. Optionally, the catalyst contains aluminum with a content of 5.0 to 6.0% m/m.

The catalysts thus constituted are prepared using the method described in the following steps:

1) coprecipitating an aqueous solution containing a soluble iron salt, preferably iron nitrate $Fe(NO_3)_3 \cdot 9H_2O$, a soluble platinum compound, preferably hexachloroplatinic acid ($H_2PtCl_6 \cdot 6H_2O$), and optionally a soluble aluminum salt, preferably nitrate aluminum $Al(NO_3)_3 \cdot 9H_2O$, with an aqueous solution of sodium carbonate, optionally, sodium hydroxide, maintaining the pH of the suspension between 7.5 and 8.0, under stirring, and at temperatures between 20° C. and 80° C., preferably, between 50° C. and 70° C., followed by aging the precipitate in this condition for 0.5 to 2.0 h;
2) filtrating the precipitate, followed by washing with water or ethanol, until the residual sodium content of the product is 0.1 to 0.3% m/m;
3) drying the precipitate obtained, at temperatures between 60° C. and 150° C., for 1 to 6 h, followed by calcinating between 300° C. and 400° C., for 1 to 5 h;
4) formatting the material obtaining catalyst tablets with typical dimensions between 0.3 and 0.7 cm in diameter and 0.5 to 1.0 cm in length and then calcinating at temperatures between 300° C. and 450° C. to obtain a hematite promoted with platinum and sodium and, optionally, with aluminum inserted into the crystalline structure of the iron oxide, so that the platinum content is between 0.1 and 0.4% m/m, the sodium content between 0.1 and 0.3% m/m and, optionally, aluminum content between 5.0 and 6.0% m/m in iron oxide balance with hematite structure and a specific surface area greater than 50 $m^2/g$.

The material can be shaped into cylindrical shapes with a hole in the middle or cylinders with a wavy outer surface.

The catalysts thus prepared avoid additional sodium incorporation steps. The presence of sodium in controlled levels, surprisingly, allows to obtain a high CO conversion activity while maintaining a high resistance to deactivation by exposure to high temperatures, as widely demonstrated in the examples. Very low sodium contents in the final product produce a catalyst with lower activity and very high sodium contents produce a catalyst with low resistance to deactivation by prolonged exposure to high temperatures.

The catalyst containing aluminum (Al) inserted into the hematite crystalline structure shows a change in the unit cell parameter to values between 0.5005 and 0.5010 nm, as measured by the X-ray diffraction technique. Aluminium provides greater catalyst activity allowing the reduction of Pt levels required in the final product.

The catalysts thus prepared are in the form of hematite promoted by platinum and sodium and optionally aluminum, being activated by a reduction procedure to transform the hematite phase ($Fe_2O_3$) into the magnetite phase ($Fe_3O_4$). The procedure is well established in the industry and consists of passing a gas containing $H_2$ or CO and water vapor, with a vapor/gas ratio typically between 2 and 6 mol/mol, at temperatures between 250° C. and 400° C., during a period of 1 to 3 h.

The catalysts thus prepared and activated can be used in the conversion reaction of CO with water vapor to produce hydrogen, at reactor inlet temperatures between 250° C. and 350° C., preferably at temperatures between 280° C. and 300° C. Optionally, it may be advantageous, to reduce the CO content and increase the useful life of the catalyst in accordance with the present invention, to maintain the maximum temperature throughout the reactor at 370° C. by injecting steam or condensate at the reactor inlet or at multiple points along the bed. The operating pressure in the reactor can be in the range of 10 to 40 $kgf/cm^2$, preferably between 20 and 30 $kgf/cm^2$. The steam/dry gas molar ratio at the reactor inlet is 0.2 to 1.0 mol/mol, preferably between 0.3 and 0.8 mol/mol. The dry gas at the reactor inlet typically contains CO contents between 5 and 30% v/v, preferably between 8 and 20% v/v.

EXAMPLES

The examples shown below aim to illustrate some ways of implementing the invention, as well as proving the practical feasibility of its application, without constituting any form of limitation of the invention.

Example 1

This comparative example illustrates that the presence of sodium is harmful to a catalyst made up of iron oxides. A 1.0 M aqueous solution of iron nitrate ($Fe(NO_3)_3 \cdot 9H_2O$) and a second 1.5 M aqueous solution of sodium carbonate ($Na_2CO_3$) were added simultaneously for 1 h under stirring, maintaining the temperature between 45° C. and 50° C. and pH between 7.5 and 8.0. After the end of precipitation, the suspension was maintained at the previous conditions of temperature, pH and agitation for another 1 h to age the precipitate. The precipitate was then filtered and separated into several parts to be washed with different amounts of water in order to obtain different levels of residual sodium in the product.

The monitoring parameter of the washing step was the conductivity of the washing water. The washed material was then dried at 100° C. for 5 h and calcined at 400° C. for 2 h to obtain a catalyst identified as $FeO_x$—$_y$Na, where $_y$Na is the sodium (Na) content in the product in oxidized form.

The crystalline phases in the samples were characterized through X-ray diffraction (XRD), using the Rigaku Miniflex II diffractometer, with a Cu tube and monochromator, with a speed of 2°/min and angle variation from 5° to 90°. The catalyst has an X-ray diffraction profile corresponding to the presence of hematite. Textural analysis (BET) was conducted by nitrogen adsorption to determine specific area on Micromeritics ASAP 2400 equipment. For determinations, samples were previously treated at 300° C. in vacuum. The composition analysis was carried out by X-ray Fluorescence (XRF) on the PANAlytical MagiX PRO equipment equipped with a 4 kW Rh tube.

The activity of the catalysts in the water gas shift reaction was measured in a fixed bed reactor and at atmospheric pressure, in commercial equipment (AutoChem Micromeritcs). The sample was initially heated in an argon flow to 100° C. and then to 350° C., at a rate of 5° C./min, in a flow of 5% $H_2$ in argon saturated with water vapor at 73° C. After this pre-treatment, the gas mixture was replaced by a mixture containing 10% v/v CO, 10% v/v $CO_2$, 2% v/v methane in $H_2$ balance, maintaining the saturator temperature with water at 73° C., corresponding to a steam/gas ratio of 0.55 mol/mol. The reaction was conducted at different temperatures with the reactor effluent being analyzed by gas chromatography. The activity of the catalysts was expressed as CO conversion (% v/v).

The results shown in Table 1 and FIG. 1 allow to conclude that, to obtain a high activity of the catalyst consisting of iron oxide, it is necessary to reduce the residual sodium content to values below 0.02% m/m. Thus, the effect of sodium on the performance of the catalyst depends on its concentration, and its complete elimination is desirable when the catalyst consists only of iron oxides.

TABLE 1

Comparative CO conversion activity in the water gas shift reaction as a function of sodium content (EXAMPLE 1).

| Sample | Na % m/m | Fe % m/m | Reaction temperature (° C.) 350° C. | 370° C. | 390° C. | 420° C. | 450° C. |
|---|---|---|---|---|---|---|---|
| $FeO_x$—1.8Na | 1.78 | 69 | 0 | 2.8 | 3.7 | 5.7 | 10.4 |
| $FeO_x$—0.41Na | 0.41 | 68 | 4.8 | 5.5 | 6.8 | 10.2 | 16.0 |
| $FeO_x$—0.01Na | <0.02 | 69 | 29.7 | 36.4 | 41.0 | 47.1 | 46.9 |

Note:
The balance for finalizing the composition of the samples is in oxygen (O).

Example 2

This example in accordance with the present invention illustrates the method of preparing the hematite-based catalyst promoted by platinum and sodium at low levels. A 1.0 M aqueous solution of iron nitrate ($Fe(NO_3)_3 \cdot 9H_2O$) containing a platinum compound soluble in water or polar solvents such as, but not restricted to, $Pt(NH_3)_4(NO_3)_2$ (CAS 20634-12-2), $H_2PtCl_5 \cdot xH_2O$ (CAS 26023-84-7), $PtCl_4$ (CAS 13454-96-1), $(NH_4)_2PtCl_4$ (CAS 13820-41-2) and $(NH_4)_2PtCl_6$ (CAS 16919-58-7) and a second 1.5 M aqueous solution of sodium carbonate ($Na_2CO_3$), were added simultaneously for 1 h, under stirring, maintaining the temperature between 45° C. and 50° C. and the pH between 7.5 and 8.0. After the end of precipitation, the suspension was maintained at the previous conditions of temperature, pH and agitation for another 1 h to age the precipitate. The precipitate was then filtered and separated into several parts to be washed with different amounts of water in order to obtain different levels of residual sodium in the product.

Figure 3:
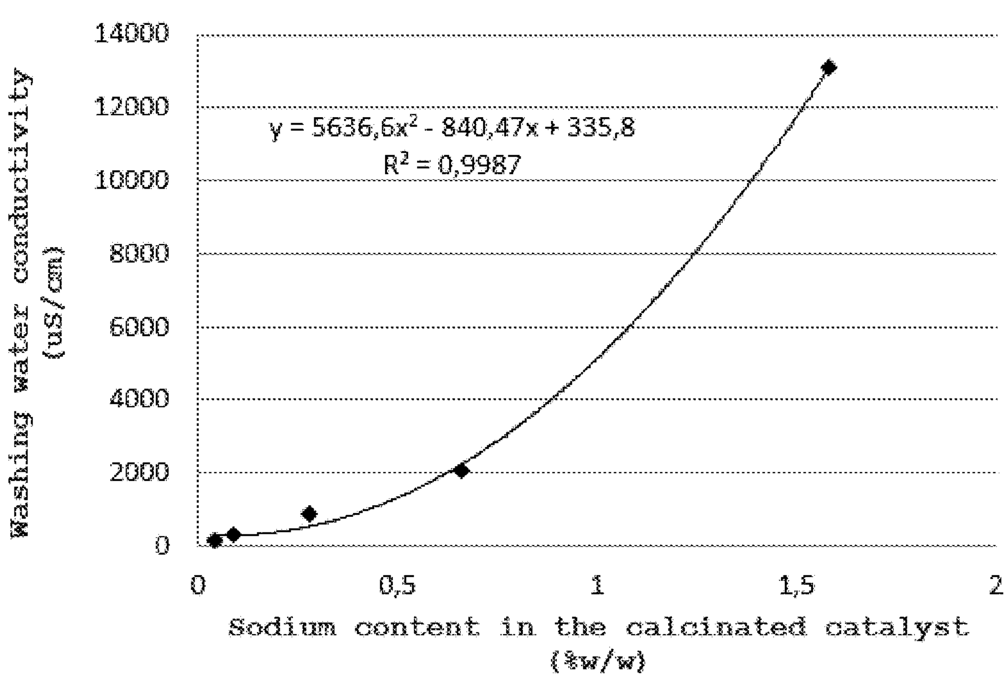
FIG. 3 illustrating a graph of the correlation between the conductivity of the washing water and the sodium content in the catalyst prepared in accordance with the present invention (EXAMPLE 2).

Monitoring the conductivity of the washing water allowed, in a simple way, to obtain different sodium (Na) contents in the final product (FIG. 3). The washed material was then dried at 100° C. for 5 h and calcined at 400° C. for 2 h to obtain samples identified as Pt—$FeO_x$-yNa, where yNa is the sodium (Na) content in the product in oxidized form. The catalyst was characterized and its CO conversion activity was measured by the water gas shift reaction carried out as described in EXAMPLE 1.

Additionally, the characterization of the platinum metallic area was carried out by the cyclohexane dehydrogenation reaction, conducted at atmospheric pressure, in a fixed bed reactor, using a saturator with cyclohexane maintained at 10° C. and hydrogen as carrier gas. The reduction of the catalyst was carried out at 300° C. for 2 hours in a hydrogen flow (40 ml/min) and then the reaction was carried out at the same temperature.

Figure 2:
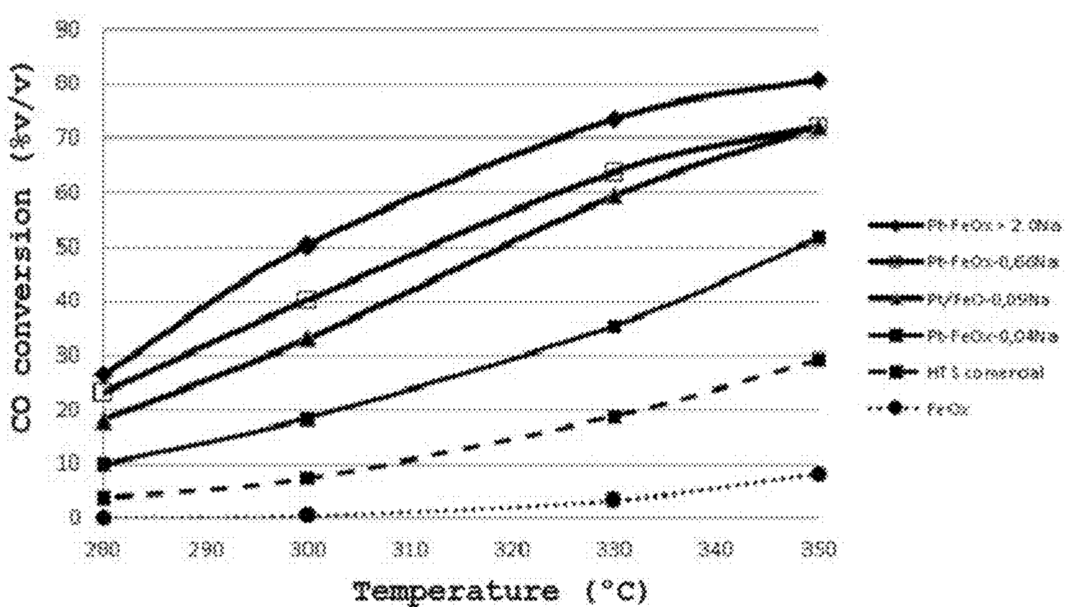
FIG. 2 illustrating a graph of the CO conversion activity in the water gas shift reaction in the catalysts prepared in accordance with EXAMPLE 2, with different residual sodium contents. The results obtained for a commercial catalyst based on iron, chromium and copper oxides and a catalyst prepared according to EXAMPLE 1 are also shown in the graph.

The results shown in Table 2 and FIG. 2 allow to conclude that to obtain high activity in the conversion of CO, the catalyst consisting of iron oxide and platinum, differently from that observed for the catalyst consisting of iron oxide (Table 2), the presence of the sodium promoter is necessary, with levels above 0.04% m/m, with levels above 2.0% m/m being desirable, in principle.

The catalysts containing platinum and promoted by sodium showed a much higher CO conversion activity than a commercial catalyst based on iron, chromium and copper oxides (FIG. 2). Although the results do not allow to say conclusively, it is believed that sodium interacts with Pt atoms forming species that have high CO conversion activity. Catalysts containing Pt have dehydrogenating activity, so the null activity for dehydrogenation is an unusual result, raising doubts regarding the effect of the interaction between Na and Pt. Such interaction is capable of reducing the dehydrogenation activity of cyclohexane, characteristic of platinum with a predominantly metallic function (Table 2). To evaluate this hypothesis, a series of catalysts with different sodium contents was evaluated, finding dehydrogenating activity for samples with low Na contents, as can be seen in Table 2.

TABLE 2

Comparative CO conversion activity in the water gas shift reaction at different temperatures as a function of sodium content (EXAMPLE 2).

| Sample | Reaction temperature 350° C. | 330° C. | 300° C. | 280° C. | $R_D$ (gmol/gcat*s) |
|---|---|---|---|---|---|
| Pt—FeOx > 2.0Na | 80.8 | 73.5 | 50.2 | 26.5 | 0 |
| Pt—FeOx—1.58Na | | | | | 0 |
| Pt—FeOx—0.66Na | 72.2 | 63.8 | 40.2 | 23.1 | 0 |
| Pt—FeOx—0.28Na | | | | | 0 |
| Pt—FeOx—0.09Na | 72.2 | 49.4 | 33.1 | 18.1 | 2.6 |
| Pt—FeOx—0.04Na | 51.7 | 35.5 | 18.4 | 9.8 | 4.4 |

Note:
The Pt content in the samples determined by the XRF technique was 0.20 ± 0.0.1 and the Fe content was 69 ± 1 m/m, with oxygen balance. RD refers to the rate of the dehydrogenation reaction of cyclohexane.

The stability of the catalysts in the water gas shift reaction was measured in a fixed bed reactor and at atmospheric pressure, in commercial equipment (AutoChem Micromeritcs). The sample was initially heated in an argon flow to 100° C. and then to 350° C., at a rate of 5° C./min, in a flow of 5% $H_2$ in argon saturated with water vapor at 73° C. After this pre-treatment, the gas mixture was replaced by a mixture containing 10% v/v CO, 10% v/v $CO_2$, 2% v/v methane in $H_2$ balance, maintaining the saturator temperature with water at 73° C., corresponding to a steam/gas ratio of 0.55 mol/mol to measure the initial activity at a temperature of 350° C. Next, the gaseous mixture was replaced by hydrogen and the temperature was raised to 500° C., being maintained under these conditions for 18 h. The temperature was then reduced to 350° C., the hydrogen was replaced by the reaction gas and a new measurement of the catalyst activity was carried out. The reactor effluent was analyzed by gas chromatography. The activity of the catalysts was expressed as CO conversion (% v/v).

Table 3 shows the initial activity and stability results. Surprisingly, however, the present invention teaches that high sodium contents, despite allowing greater activity, reduce the stability of the catalyst upon exposure to high temperatures, with the sodium content being between 0.1 and 0.3% m/m allows to get the best combined activity and stability performance.

TABLE 3

Comparative activity of initial conversion and after a period of accelerated deactivation of CO in the water gas shift reaction as a function of sodium content (EXAMPLE 2).

| Sample | X% CO initial | X% CO after deactivation |
|---|---|---|
| Pt—FeOx > 2.0Na | 70.0 | 25.0 |
| Pt—FeOx—1.58Na | 62.3 | 27.8 |
| Pt—FeOx—0.66Na | 64.6 | 31.0 |
| Pt—FeOx—0.28Na | 68.4 | 40.0 |
| Pt—FeOx—0.09Na | 59.8 | 35.2 |
| Pt—FeOx—0.04Na | 47.0 | 33.0 |

Example 3

This comparative example illustrates that the preparation method, by incorporating platinum through impregnation of the hematite phase, produces a catalyst with lower activity than that obtained by the catalyst preparation method described in the present invention, that is, by coprecipitation. A catalyst prepared according to EXAMPLE 2, containing a sodium content of less than 0.05% m/m was impregnated by the wet point method with an aqueous solution of a water-soluble platinum compound or polar solvents, such as, but not restricted to the compounds $Pt(NH_3)_4(NO_3)_2$ (CAS 20634-12-2), $H_2PtCl_5·xH_2O$ (CAS 26023-84-7), $PtCl_4$ (CAS 13454-96-1), $(NH_4)_2PtCl_4$ (CAS 13820-41-2) and $(NH_4)_2PtCl_6$ (CAS 16919-58-7). The catalyst was then dried at 100° C. for 2 h and calcined at 400° C. for 2 h to obtain a hematite-based catalyst promoted by 0.2% platinum (Pt) based on the oxidized product. The catalyst was characterized and its CO conversion activity was measured by the water gas shift reaction carried out as described in EXAMPLE 1 and by the cyclohexane dehydrogenation activity described in EXAMPLE 2.

Table 4 shows that the catalyst prepared by the coprecipitation method, in accordance with the present invention, (EXAMPLE 2) allows obtaining a higher CO conversion activity than the catalyst prepared by the impregnation method (EXAMPLE 3), in which despite the smaller metallic area estimated by the cyclohexane dehydrogenation activity. Although the results do not allow to say conclusively, it is believed that in the coprecipitation method, sodium interacts more efficiently with Pt atoms, forming species with high CO conversion activity. The greater interaction between sodium and platinum would reduce the dehydrogenation activity of cyclohexane, characteristic of platinum with a predominantly metallic function (Table 4), but would increase the activity for the CO conversion reaction through the water gas shift reaction.

TABLE 4

CO conversion activity in the water gas shift reaction of catalysts prepared by impregnation (EXAMPLE 3) and in accordance with the present invention (EXAMPLE 2).

| | Na | Pt | Reaction temperature (° C.) | | | | $R_D$ |
|---|---|---|---|---|---|---|---|
| Sample | % m/m | % m/m | 350° C. | 330° C. | 300° C. | 280° C. | (gmol/gcat*s) |
| EXAMPLE 2 | 0.04 | 0.20 | 51.7 | 35.5 | 18.4 | 9.8 | 4.4 |
| EXAMPLE 3 | <0.05 | 0.20 | 25.0 | 14.5 | 6.2 | 3.4 | 13.2 |

Note:
The Fe content was 69 ± 1 m/m, with oxygen balance. RD refers to the rate of the cyclohexane dehydrogenation reaction [gmol/g · s].

Example 4

This example in accordance with the present invention illustrates the method of preparing the hematite-based catalyst promoted by aluminum, platinum and sodium in low levels. A 1.0 M aqueous solution of iron nitrate ($Fe(NO_3)_3·9H_2O$) containing a platinum compound soluble in water or polar solvents such as, but not restricted to, the compounds $Pt(NH_3)_4(NO_3)_2$ (CAS 20634-12-2), $H_2PtCl_5·xH_2O$ (CAS 26023-84-7), $PtCl_4$ (CAS 13454-96-1), $(NH_4)_2PtCl_4$ (CAS 13820-41-2) and $(NH_4)_2PtCl_6$ (CAS 16919-58-7) and the aluminum salt $Al(NO_3)_3·9H_2O$ and a second 1.5 M aqueous solution of sodium carbonate ($Na_2CO_3$), were added simultaneously for 1 h under stirring, maintaining the temperature between 55° C. and 65° C. and the pH between 7.5 and 8.0. After the end of precipitation, the suspension was maintained at the previous conditions of temperature, pH and agitation for another 1 h to age the precipitate. The precipitate was then filtered and separated into several parts to be washed with different amounts of water in order to obtain different levels of residual sodium in the final product.

Monitoring the conductivity of the washing water made it possible to easily and simply obtain different sodium (Na) contents in the final product. The washed material was then dried at 100° C. for 5 h and calcined at 400° C. for 2 h. The catalyst had its CO conversion activity measured as described in EXAMPLE 1.

In accordance with the present invention, aluminum is inserted into the crystalline structure of hematite, reducing the size of the parameter "a" of the hematite unit cell to a value between 0.05005 and 0.5010 nm (Table 5).

TABLE 5

Type of crystalline phase with the dimensions of its unit cell measured using the X-ray diffraction technique.

| EXAMPLE | tC (nm) | crystalline phase | A (nm) | B (nm) | C (nm) |
|---|---|---|---|---|---|
| EXAMPLE 1 | 43 | Hematite | 0.50303 | 0.50303 | 1.37219 |
| EXAMPLE 2 | 44 | Hematite | 0.50354 | 0.50354 | 1.37440 |
| EXAMPLE 4 | 34 | Hematite | 0.50049 | 0.50049 | 1.36339 |

Note:
tC = average size of the hematite crystallite.
A, B and C unit cell parameters Table 6 illustrates that, with the introduction of aluminum into the formulation, the hematite phase is obtained at higher calcination temperatures. On the other hand, higher values for specific surface area are observed (Table 7), which contribute to greater catalyst activity.

TABLE 6

Crystalline structure and crystallite size of samples prepared in accordance with EXAMPLES 1, 2 and 4 identified with the X-ray diffraction (XRD) technique.

| Calcination | EXAMPLE 1 | EXAMPLE 2 | EXAMPLE 4 |
|---|---|---|---|
| T = 60° C. | Goetite 14 nm | Goetite (8 nm) | Hydroxide mixture |
| T = 300° C. | Hematite (24 nm) | Hematite (24 nm) | Hydroxide mixture |
| T = 400° C. | Hematite (43 nm) | Hematite (44 nm) | Hematite (34 nm) |

Note:
Sodium content in samples <0.1% m/m, Pt content of 0.2% m/m in EXAMPLES 2 and 4. Aluminum content in EXAMPLE 4 of 5.2% m/m.

TABLE 7

Composition properties, specific area and CO conversion activity as a function of temperature in the water gas shift reaction.

| Sample | Type | S ($m^2$/g) | Pt (% m/m) | Al (% m/m) | Reaction temperature (° C.) 350° C. | 330° C. | 300° C. | 280° C. |
|---|---|---|---|---|---|---|---|---|
| EXAMPLE 1 | FeOx | 47.9 | 0 | 0 | 8.1 | 3.3 | 0.4 | 0 |
| EXAMPLE 2 | Pt—FeOx | 51.1 | 0.2 | 0 | 48.9 | 36.6 | 21.2 | 12.1 |
| EXAMPLE 4 | Pt—Al—$FeO_x$ | 125.0 | 0.2 | 5.4 | 63.6 | 39.4 | 21.4 | 14.9 |

Note:
S = specific surface area determined by the $N_2$ adsorption technique after calcination at 400° C.

It should be noted that, although the present invention has been described in relation to the attached drawings, it may undergo modifications and adaptations by persons skilled in the subject, depending on the specific situation, but as long as they are within the inventive scope defined here.

The invention claimed is:

1. A method for preparing a water gas shift catalyst, the method comprising the following steps:

1) coprecipitating a solution containing a soluble iron salt, a soluble platinum compound and optionally a soluble aluminum salt, in a first polar solvent, with a soluble sodium salt to form a suspension comprising a precipitate, 2) maintaining the pH of the suspension between 7.5 and 8.0, under stirring, and at a temperature between 20 and −80 degrees Centigrade (° C.), followed by aging of the suspension at said pH under stirring and at the temperature between 2° and 80° C. for 0.5 to 2.0-hours (h);

3) filtering and washing the precipitate formed with a second polar solvent until a residual sodium content of the precipitate is between 0.11 and 0.3% weight in weight (w/w);

4) drying the precipitate obtained at a temperature between 60° C. and 150° C. for 1 to 6 h, followed by calcination between 300° C. and 400° C., for 1 to 5 h to form a material;

5) formatting the material to obtain catalyst tablets and, then, calcinating at a temperature between 300° C. and 450° C. to obtain hematite promoted with platinum and sodium and, optionally, with aluminum.

2. The method according to claim 1, wherein the soluble iron salt comprises iron nitrate.

3. The method according to claim 1, wherein the soluble platinum compound comprises hexachloroplatinic acid ($H_2PtCl_6 \cdot 6H_2O$).

4. The method according to claim 1, wherein the first and second polar solvent comprise water or ethanol.

5. The method according to claim 1, wherein the soluble sodium salt comprises is sodium carbonate or sodium hydroxide.

6. The method according to claim 1, wherein coprecipitation occurs at a temperature between 5° and 70° C.

7. The method according to claim 1, wherein aluminum is inserted into a hematite crystal lattice which has a unit cell parameter between 0.05005 and 0.5010 nanometers (nm) and has a specific surface area greater than 100 meters squared per gram ($m^2$/g).

8. The catalyst, as obtained by the method as defined in claim 1, wherein the catalyst has a platinum content between 0.1 and 0.4% w/w, a sodium content between 0.11 and 0.3% w/w and an aluminum content between 5.0 and 6.0% w/w in iron oxide balance with hematite structure and a specific surface area greater than 50 $m^2$/g.

9. A process for reducing carbon monoxide content by a water gas shift reaction, the process comprising: placing in contact with the catalyst, as prepared by the method described in claim 1, with a synthesis gas containing between 5 and 30% CO, a steam/dry gas ratio between 0.2 and 1.0 mol/mol, and a reactor inlet temperature between 250° C. and 350° C.

10. The process, according to claim 9, wherein the synthesis gas contains between 8 and 20% CO, a steam/dry gas ratio between 0.3 and 0.8 moles per mol (mol/mol) and a reactor inlet temperature between 280° C. and 300° C.

11. The process, according to claim 9, wherein a reactor outlet temperature is a maximum of 370° C. controlled by a joint supply of the synthesis gas with a stream of steam or condensate.

* * * * *